United States Patent [19]
Rodal et al.

[11] Patent Number: 4,730,108
[45] Date of Patent: Mar. 8, 1988

[54] AMBIENT LIGHT INSENSITIVE CIRCUIT WITH FREQUENCY MATCHING

[75] Inventors: David R. Rodal, Palo Alto; Nathan W. Osborn, Menlo Park, both of Calif.

[73] Assignee: Ampex Corporation, Redwood City, Calif.

[21] Appl. No.: 851,000

[22] Filed: Apr. 11, 1986

[51] Int. Cl.[4] ............................................. G01V 9/04
[52] U.S. Cl. .................................. 250/221; 250/222.1; 242/188
[58] Field of Search ................ 242/188, 195; 250/570, 250/561, 221, 222.1

[56] References Cited

U.S. PATENT DOCUMENTS

| | | | |
|---|---|---|---|
| 3,596,006 | 7/1971 | Lawhon | 242/188 |
| 3,861,622 | 1/1975 | Wakami et al. | 242/188 |
| 3,889,118 | 6/1975 | Walker | 250/221 |
| 4,029,957 | 6/1977 | Betz et al. | 250/221 |
| 4,068,222 | 1/1978 | Treviranus | 250/221 |
| 4,570,075 | 2/1986 | Spiero | 250/570 |

Primary Examiner—David C. Nelms
Assistant Examiner—Chung Seo
Attorney, Agent, or Firm—Nat Kallman; George B. Almeida; Richard P. Lange

[57] ABSTRACT

An optical sensing circuit useful for detecting the end of a moving tape in a tape transport includes a light source and a light sensor which are closely spaced across a gap. The radiation output of the light source is modulated at a selected frequency which is determined by the operating frequency of a frequency detector. In the absence of a light obstruction, such as passage of the tape in the optical path between the light source and the light sensor, the modulated output from the light source is detected by the sensor. The processed signal from the sensor, which is characterized by the modulation frequency, is applied to the frequency detector. The detector recognizes only those signals having the modulated frequency, and does not respond to signals of different frequencies, which may result from impingement of other radiation than that from the light source on the photosensor.

11 Claims, 1 Drawing Figure

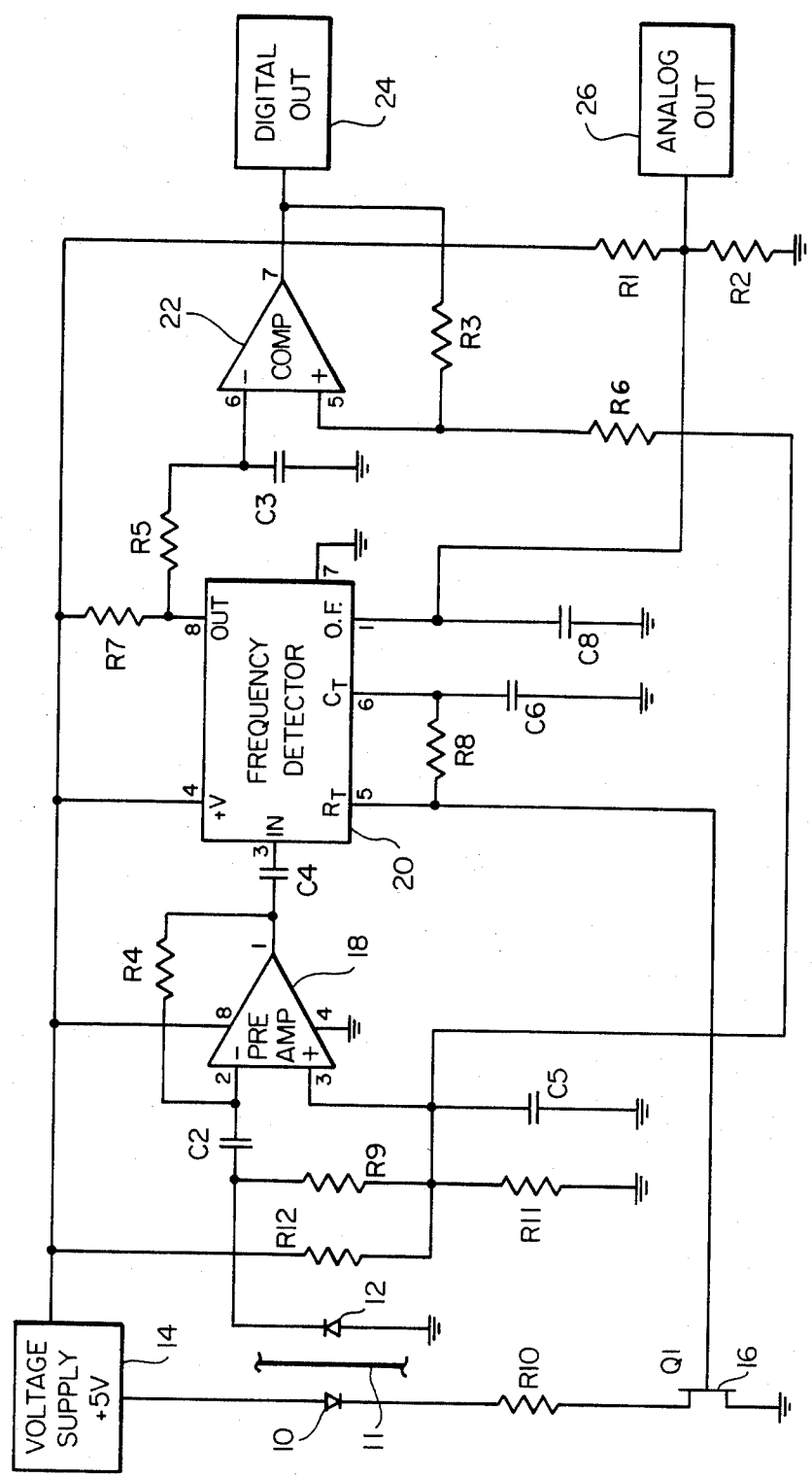
FIG_1

_(4,730,108)_

AMBIENT LIGHT INSENSITIVE CIRCUIT WITH FREQUENCY MATCHING

DESCRIPTION

TECHNICAL FIELD

This invention relates to an optical circuit and particularly to an optical sensing circuit which is insensitive to stray light.

BACKGROUND OF THE INVENTION

In tape transport apparatus wherein a recording tape is fed between a supply reel and a takeup reel, it has been found necessary to determine when the end of a tape has been totally disengaged from the reel supplying the tape to the other reel. At such point in time, the motors that are driving the tape reels and the tape need to be braked and inactivated. If the motors continue to rotate after the end of the tape has been removed from the reel that is supplying the tape, then the tape and particularly the end portion of the tape will be subject to physical damage with possible loss of recorded data, among other things. This problem appears in tape transports wherein the tape is completely unwound from one reel and wound onto the other reel, and in tape apparatus utilizing closed video-cassettes in which the tape is captive and the ends are not released from one tape reel to the other. In the latter case, if the end of the tape is not sensed, there is the danger that the tape movement, which is usually at high speed, would not be properly stopped and that the tape end would disengage from the reel.

In the past, an end of tape sensor constituted a conductive element attached to the end of the tape which triggered an electrical signal to indicate that the tape had reached its physical end and thus had been completely released from the reel on which it had been wound. This was implemented by attaching a material different than that of the recording tape, which required additional labor and had its shortcomings in that it was subject to separation from the tape with use. Another approach was to record a signal at the end of the tape which could be read out by an associated sensing circuit. This arrangement also added labor and expense as well as the requirement for space allocation on the tape.

More recent approaches to end of tape sensing employ light sensing devices, such as photodiodes, which are activated by a light source that provides radiation to the photodiode once the end of the tape has moved past the optical path. However, it was found that light sensing devices are sensitive to any stray light, which may come from ambient light or strobe light, by way of example. To overcome this problem, relatively large mechanical shields were provided to surround the sensing element or photodiode so that the sensor did not receive the spurious light. With the trend towards making data processing apparatus, such as tape transports, more compact, less expensive and more reliable, these mechanical shields posed significant problems of space, cost and reliability. Therefore, it would be advantageous to provide an end of tape sensor that is compact and inexpensive, and which selectively responds to a specified light source.

SUMMARY OF THE INVENTION

An object of this invention is to provide an optical sensing means which is insensitive to stray light and is compact, reliable and of relatively low cost.

In accordance with this invention, an optical tape sensing circuit comprises a source of light radiation which is modulated at a predetermined frequency, and a photosensor in juxtaposition with the light source, to form a gap therebetween through which a tape is directed. While the opaque tape is within the gap area, the photodetector is not operative. However, once the end of the tape or the translucent leader has passed through the gap so that there is little or no obstruction between the light source and the photosensor, the modulated light radiation impinges on the photosensor thereby activating it to conduct. A frequency detector compares the modulated output signal from the photosensor to a modulated signal of substantially the same frequency. If the signal matches that received by the photosensor, the frequency detector generates a valid output signal which is passed to a buffer stage with hysteresis. A delayed digital signal signifying that the end of tape has been sensed, is provided to a utilization circuit for further processing.

BRIEF DESCRIPTION OF THE DRAWING

The invention will be described in detail with reference to the sole FIGURE of the drawing which is a schematic and block circuit diagram of an otpical sensing circuit, made in accordance with this invention.

DESCRIPTION OF THE PREFERRED EMBODIMENT

With reference to the drawing, an optical sensing system includes a light source 10, such as a light emitting diode (LED) ad a light sensor 12, such as a photodiode. A voltage source 14 supplies a voltage, such as +5 volts for example, to the LED to stimulate emission of radiation modulated at a given frequency. A relatively small gap exists between the closely spaced LED 10 and the photodiode 12, through which a tape 11 is directed in its passage from one tape reel to the other. When using the optical system in a tape transport form the purpose of end-of-tape sensing, the nontransparent tape is moved through the gap and the photodiode is not able to receive any radiation from the LED. When the optical path between the LED and photodiode is obstructed, the sensing circuit of this invention is inactive. However when the end of the tape has passed through the gap so that the optical path is essentially unobstructed, the photodiode 12 is energized by the lbight radiation from the light source. The light is of sufficient magnitude to excite the photodiode to conduct and generate an output signal.

The cathode of the LED is coupled through a resistor R10 to a field effect transistor (FET) 16, which switches the LED on and off with a square wave signal having a known modulating frequency. The modulation frequency is determined by the values of a resistor R8 and capacitor C6 which are tied to the gate electrode of the FET and to the input circuit of a frequency detector 20. The modulation frequency is selected to match the operating frequency of the detector 20.

During operation of the tape transport, when the moving tape has completely passed through the gap between the LED and the photodiode, thereby denoting the end of tape, the photodiode is activated and biased to conduct current. A bias resistor R9 is coupled at one end between the cathode of the photodiode and an AC coupling capacitor C2 and at its other end to the junction between voltage divider resistors R11 and R12. Resistor R12 is connected to the single power supply 14, which in this particular implementation provides a +5 volt output, and resistor R11 is tied to ground potential. Consequently, a lower voltage of +2.5 volts is applied to the cathode of the photodiode. If a high intensity strobe light flash spuriously impinges on the photodiode, for example, when tape is present the photodiode is saturated and will not conduct. Thus no false end-of-tape output signal is generated by the optical sensing circuit disclosed herein.

Current from the photodiode is fed through the AC coupling capacitor C2 which blocks D.C. current, and serves as a high pass filter in conjunction with the resistor R9. The filtered signal containing the modulating frequency characteristic of the LED is applied to a gain stage including a preamplifier 18 and a resistor R4, which provides AC gain. The preamplifier 18 also receives a reference voltage supplied from the voltage source 14 through the bias resistor R12 and a low pass filter including the resistor R11 and a capacitor C5. The gain resistor R4 is connected in parallel across the preamplifier 18.

The amplified output signal from the preamplifier 18, which is a 2.5 volt DC signal with superimposed AC characterized by the modulation frequency of the LED radiation, is passed through a high pass filter and AC coupling capacitor C4 to the frequency detector 20. The frequency detector also receives the modulated frequency signal from the channel including the LED and FET or from a source providing a signal of substantially the same frequency, and the frequency of this modulated signal is compared to the input signal obtained from the preamplifier 18. Resistor R8 and capacitor C6 are coupled to the gate electrode of the FET and determine the selected center frequency which is used as a reference for comparison to the input signal from the preamplifier 18. In the event that the frequency of the signal from the preamplifier 18 and the frequency of the modulated signal from the LED channel match substantially, the frequency detector provides a valid output signal through a pullup resistor R7 and via an integrator consisting of resistor R5 and capacitor C3 coupled to a comparator 22.

The comparator 22 comprises the filtered signal from the detector 20 to a reference voltage derived from the voltage supply 14 through bias resistors R11 and R12 and low pass filter capacitor C5. The reference voltage is passed through a hysteresis circuit consisting of resistors R3 and R6 to the positive input terminal of the comparator 22. The hysteresis circuit provides regenerative feedback to the comparator 22 to prevent undue oscillations. The reference voltage, which is derived from the power source 14, is compared to the voltage at the negative input terminal of the comparator 22 that is connected to the low pass filter including resistor R5 and capacitor C3. If a valid signal has been sensed by the frequency detector 20, a digital output signal appears at an output circuit 24, indicating that the gap between the LED 10 and photodiode 12 is unobstructed and that the end of the tape has passed through the light path. In addition, an analog output signal is derived from the detector 20 through a filter capacitor C8 and a resistor divider including resistors R1 and R2. This analog signal provides an indication of the amplitude of the detected signal to an analog utilization circuit 26.

The network including resistor R5 and capacitor C3 and the hysteresis circuit with resistor elements R3 and R6 provides a sufficient delay to a switching circuit of the detector 20 so that noise signals and relatively short flash signals, such as produced by a strobe light, are not processed as a valid end-of-tape signal. The delay is on the order of about 15 milliseconds, for example, which is of greater duration than a strobe flash. Also when the tape transport initially moves tape between reels, there is a short period, which may be about 10 milliseconds, during which there is no tape in the gap between the LED and photodiode prior to takeup by the tape accepting reel. The delay serves to preclude generation of an end-of-tape signal, which if it appeared would automatically and erroneously shut down the tape drive system.

The terminal pin 1 of the frequency detector circuit is set at a switching level reference, established by resistors R1 and R2 which are coupled between the frequency detector 20 and the analog utilization circuit 26. The DC level at terminal pin 1 is substantially at the same level as that of the input frequency signal received by the detector 20 from the preamplifier 18. A valid end-of-tape signal is derived from terminal pin 1 of the frequency detector 20 for application to the analog utilization circuit 26.

By means of the simple, compact and inexpensive circuit disclosed herein, end of tape sensing is made facile and reliable. The circuit does not respond to spurious light signals of modulated frequencies different than that of the light source, and therefore does not give false indications in the presence of strobe light and ambient light and the like. The utilization circuits 24 and 26 indicate that the optical path between the LED and the photodiode is clear and, in the case of a tape transport, is indicative of the passing of the end of the tape through the gap and the optical path.

What is claimed is:
1. An optical sensing circuit for detecting the end of a nontransparent moving body comprising:
   a source of light radiation;
   means for modulating said light radiation at a predetermined frequency;
   photosensor means spaced from said light source for generating an output signal having the predetermined modulation frequency when the space between said source and said photosensor is unobstructed; and
   a frequency detector coupled to said photosensor means for supplying a valid signal indicative of the end of tape only when the frequency of the modulated signal from said light source substantially matches the frequency of the output signal from said photosensor means.
2. An optical sensing circuit as in claim 1, including:
   a preamplifier having a selected high gain at said predetermined modulation frequency, and AC coupled between the output of said photosensor means and the input of said frequency detector; and
   a comparator for supplying an end-of-tape signal in response to said valid signal from said frequency detector.
3. An optical sensing circuit as in claim 2, including a power supply for providing a d.c. voltage to said light source and photosensor, and a voltage divider coupled between said power supply and the inputs to said pre- amplifier and comparator for providing a reference voltage to respective input terminals thereof.

4. An optical sensing circuit as in claim 2, including hysteresis circuit means coupled to said comparator for providing regenerative feedback thereto to prevent undue end-of-tape signal oscillations.

5. An optical sensing circuit as in claim 2, including a high pass filter coupled between said photosensor and said preamplifier, and a low pass filter coupled between said frequency detector and said comparator.

6. An optical sensing circuit as in claim 1, wherein:
said modulating means comprises a field effect transistor coupled to said source of light, and a resistive-capacitive circuit for determining said predetermined modulation frequency connected to the gate electrode of said field effect transistor.

7. An optical sensing circuit as in claim 6, wherein said field effect transistor generates a square wave of said predetermined modulation frequency for modulating the radiation output of said source of light.

8. An optical sensing circuit as in claim 2, wherein said comparator supplies the end-of-tape signal as a digital output signal, and said frequency detector supplies the end-of-tape signal as an analog output signal, wherein either the digital or analog output signal provides indications of an unobstructed light path in the space between said light source and said photosensor.

9. An optical sensing system as in claim 2, including time constant circuit means coupled to said frequency detector, for providing a fixed delay to said valid signal from said frequency detector so that spurious light signals of duration shorter than the delay time of said time constant circuit do not generate said valid signal.

10. A method of optically sensing the passage of the end of tape during the transfer of tape from one tape reel to another in a tape transport, comprising the steps of:
generating a modulated light signal at a given modulation frequency;
sensing the modulated light signal at the given modulation frequency when there is no obstruction to interrupt the modulated light signal;
supply a valid signal indicative of the sensed presence of said given modulation frequency;
determining if the frequency of the valid signal substantially matches said given modulation frequency; and
providing an end-of-tape signal in response to the signals substantially matching, to indicate that the tape no longer interrupts the modulated light signal.

11. A method as in claim 10, further including the step of providing a delay to said valid signal so that signals of duration shorter than said delay are not provided as said end-of-tape signal.

* * * * *

UNITED STATES PATENT AND TRADEMARK OFFICE
CERTIFICATE OF CORRECTION

PATENT NO. : 4,730,108

DATED : March 8, 1988

INVENTOR(S) : David R. Rodal et al

It is certified that error appears in the above-identified patent and that said Letters Patent is hereby corrected as shown below:

```
Column 2, line 37, delete "ad" insert --and--;
          line 44, delete "form" insert --for--;
Column 3, line 49, delete "comprises" insert --compares--;
Column 6, line 16, delete "supply" insert --supplying--.
```

Signed and Sealed this

Ninth Day of August, 1988

Attest:

DONALD J. QUIGG

Attesting Officer

Commissioner of Patents and Trademarks